Nov. 6, 1956  J. L. PAULY  2,769,938
MEANS FOR FLASHING SIGNAL LIGHTS
Filed March 11, 1955

INVENTOR.
Jacob L. Pauly
BY
Owen & Owen
ATTORNEYS

2,769,938
MEANS FOR FLASHING SIGNAL LIGHTS

Jacob L. Pauly, Inglewood, Calif., assignor to Theodore W. Hallerberg, Los Angeles, Calif.

Application March 11, 1955, Serial No. 493,719

3 Claims. (Cl. 315—210)

This invention relates to means for flashing electrically energized signal lights and is particularly directed to a device that is usable for controlling airplane clearance lights.

At the present time, airplanes are equipped with clearance lights adjacent each wing tip and at the rear of the tail group, and it is customary to energize the lights in such a manner that one wing tip light and upper tail light are on, while the opposite wing tip light and a lower tail light are off. Sequential and alternate operation of the lights in the stated pairs is continued as long as the airplane is in night operation, and is usually accomplished by a motor driven commutator connected between the lights and their energizing power source.

It will be apparent that if for any reason the commutation system fails, the most that can be expected is that it will fail in such a position that one wing light and one tail light will be energized constantly while the opposite pair will remain dark. It is, of course, possible for a commutated device to fail in such a position that none of the lights would receive energy so that no signal at all would be given.

The primary object of the present invention is to provide a control device for lights such as airplane warning and clearance lights which are so arranged that failure results in all lights being energized.

Another object of the invention is to provide a simple, reliable and light weight, thermally operated switching device for electrically energized airplane clearance and warning lights that is not likely to get out of order, but which, if failure does occur, results in all of the lights being illuminated.

Other objects and advantages of the invention will become apparent from the following specification, reference being had to the accompanying drawings, in which Fig. 1 is a circuit diagram and somewhat diagrammatic view of the parts comprising the present invention connected to operate a conventional set of airplane warning and clearance lights;

Briefly, the present invention comprises a combination of means to operate an electrical signal light system wherein groups of lights are alternately energized in which the improvement includes a normally closed switch in series with all signal lights and the energizing power source, and a means to open the normally closed switch which is activated by normal operation of the sequential or alternating switching means. In the preferred form of the invention the signal lights are switched in their alternate groups by a thermally actuated double-throw switch, and the normally closed switch is made responsive to the heat developed in said thermally actuated switch so that normal heat developed by the latter when operating properly will open the normally closed switch, and failure of the thermally actuated switch to develop proper heat for any reason will cause the normally closed switch to complete a circuit by which all of the lights will be illuminated.

Figure 2:
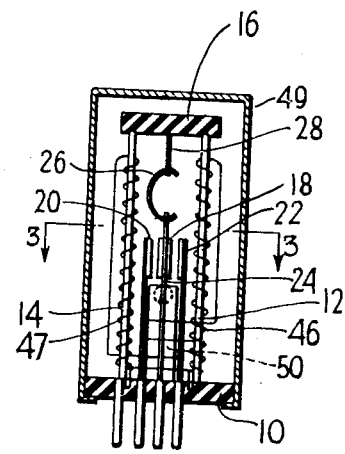
Fig. 2 is a diagrammatic view of a control device embodying the present invention.
Figure 4:
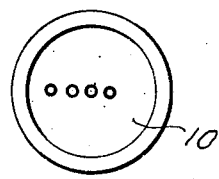
Fig. 4 is a bottom view of the device shown in Fig. 3.

Referring to Fig. 2 of the drawings the preferred form of the present invention includes an insulating base plate 10 on which the various components are mounted. Extending from the base plate are two opposing thermal arms 12 and 14 each constructed of the same type of bimetal so as to respond similarly to heating and cooling. The arms 12 and 14 are connected at their free ends to a common yoke 16, the connection being such that the yoke is moved by either of the two arms, when energized, without causing binding or excessive friction. Between the arms 12 and 14 and operated by the yoke 16 is a C-spring snap action double-throw switch 18 having a movable center contact cooperating with left and right stationary contacts 20 and 22. The center contact of the double-throw switch thus formed is snapped from one position to the other by any suitable mechanism and for this purpose the center contact is carried by a flexible supporting contact arm 24 mounted in a stationary manner to the base plate 10 at one end and having its opposite end associated with a C-shaped spring 26. The opposite leg of the C-spring 26 is connected to a short arm 28 which has a small lug extending into engagement with the spring. At its far end the small arm 28 is rigidly connected to the yoke 16 so as to be moved thereby. The short arm 28 and spring 26 thus form an over-center mechanism for the contact arm 24 in a manner well understood in the art, and so arranged that when the short arm 28 is moved to one side or the other beyond the plane of the contact arm 24 the spring is compressed and thus forces the switch contact carrying arm 24 to the right or left to close a circuit between the movable center contact 18 and one of the opposed right or left contacts 20 or 22.

The movable, arm-carried contact 18 is connected through arm 24 to a power source such as a battery B. Stationary contact 22 is connected by a lead 39 to a pair or group of signal lights 40 and 41, while the opposite stationary contact 20 is connected by a lead 42 to another pair or group of signal lights 43 and 44.

A heating coil for the bimetallic thermal arm 12 is designated 46 and is in parallel with the lamp pair or group 43, 44 the circuit thereto being completed whenever the circuit between contacts 18 and 20 is closed. Similarly a heating coil 47 is wound around the thermal arm 14 and its circuit is closed whenever the movable contact 18 is moved to complete a circuit between itself and contact 22.

It will thus be seen that the signal lights are disposed in pairs or groups and are energized alternately by closure of contact 18 against either of the stationary contacts 20 and 22, the movable contact being snapped from one position to another by the yoke 16 which, in turn, is moved by the thermal arms 12 or 14, depending on which is energized. Each of the arms 12 and 14 is arranged so that its heating coil 46 or 47 will move it in an inward direction so that if the coils are energized alternately the yoke will be moved back and forth across the center position of the snap switch and snap the movable contact 18 first against the contact 22 and then against the contact 20 sequentially.

Figure 1:
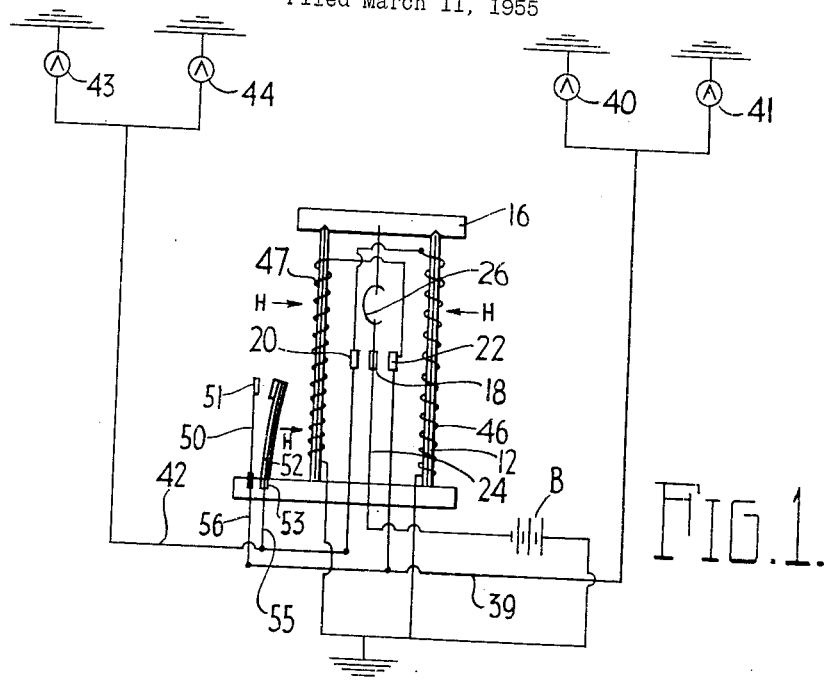
Figure 3:
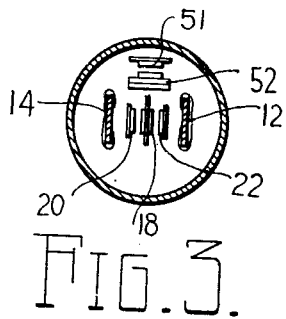
Fig. 3 is a section on line 3—3 of Fig. 2.

Heating coil 46 being in parallel with lamp pair 43 and 44 is energized whenever the circuit between contacts 18 and 20 is closed by reason of the movable contact being at the leftward position shown in Fig. 1. As the coil 46 is heated, it moves yoke 16 to the left and eventually the end of the short arm 28 passes the line of centers of the C-spring 26 and the contact arm 24 will be snapped to the right. This opens the circuit to the heating coil 46 and closes the circuit to heating coil 47 at the same time that signal lights 43, 44 are extinguished and lights 40, 41 energized. Heating of coil 47 begins to move the yoke 16 to the right, eventually passing far enough to snap the arm 24 to the left after which the cycle is repeated.

It will thus be seen that either coil 46 or 47 is always being heated during normal operation so that the interior of a housing 49 that surrounds the switch is at a relatively high temperature compared to the ambient temperature of the entire unit. Mounted at any convenient location within the housing, either at the side or at the top, or mounted to extend from the base 10, is a normally closed, thermally responsive switch 50. The switch 50 comprises a stationary contact 51 and a movable contact carried at an end of a bimetallic arm 52. Both contacts 50 and 52 are insulated from ground as well as from each other. Contact arm 52 is mounted at 53 at any convenient manner so that the switch can be connected across the stationary contacts 20 and 22. For this purpose leads 55 and 56 are provided which are preferably connected within the housing of the unit as indicated in Fig. 2. The entire unit may be housed in an envelope similar to those used for common vacuum tubes and may be "plugged in" to the socket in a similar manner.

By reason of its physical proximity to the heating coils 46 and 47 the switch 50 will be opened as soon as either of the coils has been heated sufficiently and will remain open as long as one or the other of them is functioning normally. In the event of failure of either of the coils 46 or 47 switch 50 will be closed as follows: Assume that the double-throw switch is standing in its leftward position in Fig. 1. The circuits to lamp pair 43, 44 and to coil 46 will be closed, so that coil 46 should be heating. If coil 46 is not operating, or if the circuit thereto is broken in any manner, the yoke will not be moved and the interior of the unit will cool to an extent sufficient for switch 50 to close. However, let it be assumed that failure of coil 46 occurs during the time that the switch is in its rightward position in Fig. 1. In this event coil 47 will be heated and will shift yoke 16 to the right and snap arm 24 to the left after the usual predetermined flashing interval. This disconnects coil 47, but coil 46 is inoperative so that the unit will cease to give off heat and will cool down to the point where switch 50 is closed.

It will thus be seen that since yoke 16 is positively operated in both directions, as distinguished from movement in one direction by heating and in the reverse direction by cooling, it will always go to a position where it attempts to close a circuit through the inoperative or "dead" heating coil 46 or 47. The result of this is that the condition of failure is always the same. By interconnecting contacts 20 and 22 through the normally closed switch 50, a circuit is established from the power source, through arm 24, to one of the contacts 20, 22 and its light group in the normal manner, and from that contact against which the arm-carried contact 18 is standing, through switch 50, to the other contact and its associated light group. Thus all lights are turned on in the event of failure of the heating coils 46 or 47 of the flashing mechanism. The normally closed switch 50 thus completes a circuit from whichever of the contacts 20 or 22 is receiving energy from the power source to that light pair which would be extinguished if the sequential operation of the double-throw switch were continued.

While the invention has been disclosed in conjunction with a specific form and disposition of the parts, it should be understood that numerous modifications and changes can be made without departing from the spirit of the attached claims.

What I claim is:

1. An electrical signal light system comprising a power source, a plurality of groups of signal lights, circuit closing means automatically energizing said signal lights from said power source in recurring sequence, a normally closed switch in series with all lights and said power source, and means maintaining said normally closed switch open only during normal operation of said circuit closing means.

2. An electrical signal light system comprising a power source, two groups of signal lights, circuit closing means automatically energizing said signal lights from said power source in sequence, said circuit closing means including a thermally operated double throw switch, and a normally closed thermally opened switch in heat transfer relation to said first switch and in series with all of said lights whereby normal thermal operation of said first switch opens said normally closed switch, and failure of said first switch causes said normally closed switch to move to its normal closed position.

3. An electrical signal light system comprising a power source, a plurality of groups of signal lights, circuit closing means automatically energizing said signal lights from said power source in recurring sequence, said circuit closing means including a thermally operated switch having stationary contacts connected to respective groups of lights and a movable contact connected to said power source, and a normally closed thermally operated switch in heat transfer relation to said first switch and connected between said stationary contacts whereby normal operation of said first switch maintains said normally closed switch in open position and failure of said first switch causes said normally closed switch to move to closed position to close a circuit between said stationary contacts and thus from said energizing power source to all groups of lights connected to said stationary contacts.

References Cited in the file of this patent
UNITED STATES PATENTS

| | | |
|---|---|---|
| 2,659,787 | Prickett | Nov. 17, 1953 |
| 2,661,406 | Callan | Dec. 1, 1953 |
| 2,717,331 | Hollins | Sept. 6, 1955 |